(12) United States Patent
Gerner et al.

(10) Patent No.: US 8,467,210 B2
(45) Date of Patent: Jun. 18, 2013

(54) METHOD FOR CONTROLLING A VAR COMPENSATOR

(75) Inventors: Andreas Gerner, Nürnberg (DE);
Armin Werner, Nürnberg (DE); Tanja Dambach, legal representative, Munich (DE); Christa Werner, legal representative, Uehlingen-Birkendorf (DE); Martin Werner, legal representative, Uehlingen-Birkendorf (DE); Severin Werner, legal representative, Freiburg (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 12/741,657

(22) PCT Filed: Nov. 7, 2007

(86) PCT No.: PCT/EP2007/009906
§ 371 (c)(1),
(2), (4) Date: Sep. 16, 2010

(87) PCT Pub. No.: WO2009/059628
PCT Pub. Date: May 14, 2009

(65) Prior Publication Data
US 2010/0327821 A1    Dec. 30, 2010

(51) Int. Cl.
*H02M 3/24* (2006.01)
(52) U.S. Cl.
USPC .............................. 363/96; 363/37; 361/107
(58) Field of Classification Search
USPC ............... 363/16, 17, 34–41, 58, 72, 95, 96, 363/98, 132, 136, 165; 318/798, 803, 806, 318/808, 811; 361/103, 107, 115, 113, 100; 323/207, 209, 211, 235
See application file for complete search history.

(56) References Cited

U.S. PATENT DOCUMENTS

| | | | | |
|---|---|---|---|---|
| 4,812,669 A | * | 3/1989 | Takeda et al. | 307/105 |
| 4,977,492 A | * | 12/1990 | Kirchberg et al. | 363/41 |
| 5,077,517 A | * | 12/1991 | Tanoue et al. | 323/207 |
| 5,148,362 A | * | 9/1992 | Braun et al. | 363/95 |
| 5,291,120 A | * | 3/1994 | Leowald et al. | 323/209 |

(Continued)

FOREIGN PATENT DOCUMENTS

| | | | |
|---|---|---|---|
| DE | 3236071 | * | 1/1984 |
| DE | 3236071 A1 | | 1/1984 |

(Continued)

*Primary Examiner* — Rajnikant Patel
(74) *Attorney, Agent, or Firm* — Laurence A. Greenberg; Werner H. Stemer; Ralph E. Locher

(57) ABSTRACT

In order to provide a method for regulating a reactive power compensator, which is connected to an alternating current line having multiple phases, wherein for each phase an actual voltage V12, V23 and V31 present thereon is detected and from the actual voltages V12, V23 and V31 a counter system actual fraction is calculated. A control circuit suppresses the counter system actual fraction. A feedback loop determines the level of suppression of the counter system actual fraction with the help of controlled parameters. The method enables an adjustment of the counter system that is largely independent from operating staff. Accordingly, a comparator unit compares the counter system actual fraction to the counter system target fraction and defines the controlled parameters as a function of the comparison.

8 Claims, 2 Drawing Sheets

U.S. PATENT DOCUMENTS

| | | | |
|---|---|---|---|
| 5,880,948 A * | 3/1999 | Nachbauer | 363/95 |
| 6,972,976 B2 | 12/2005 | Tarkiainen et al. | |
| 7,120,039 B2 * | 10/2006 | Burger et al. | 363/98 |
| 2005/0201130 A1 | 9/2005 | Tarkiainen et al. | |

FOREIGN PATENT DOCUMENTS

| | | |
|---|---|---|
| EP | 0471106 A1 | 2/1992 |
| JP | 59021237 A | 2/1984 |
| JP | 8322153 A | 12/1996 |
| WO | 2004082096 A1 | 9/2004 |
| WO | 2007119855 A1 | 10/2007 |

\* cited by examiner

METHOD FOR CONTROLLING A VAR COMPENSATOR

BACKGROUND OF THE INVENTION

Field of the Invention

The invention relates to a method for controlling a VAr compensator which is connected to an AC voltage which has a plurality of phases, in which an actual voltage, which is dropped across each phase, is determined for each phase, and a negative phase-sequence system actual component is calculated from the actual voltages, and in which a control loop suppresses the negative phase-sequence system actual component, wherein a feedback loop determines the degree of suppression of the negative phase-sequence system actual component with the aid of control parameters.

A method such as this is already known from routine practice in the field of power transmission and distribution and is used, for example, in conjunction with the control of a so-called static VAr compensator (SVC). An SVC is generally used to stabilize and balance the voltages in a power distributor system. For this purpose, inductances or capacitances are connected in parallel with the power supply system, by means of expedient switching units. Semiconductor switches, in particular, are provided as switching units, which prevent or allow current flow via said inductance or capacitance. An SVC can therefore be used to suppress a so-called negative phase-sequence system, by balancing phase voltages.

Figure 1:
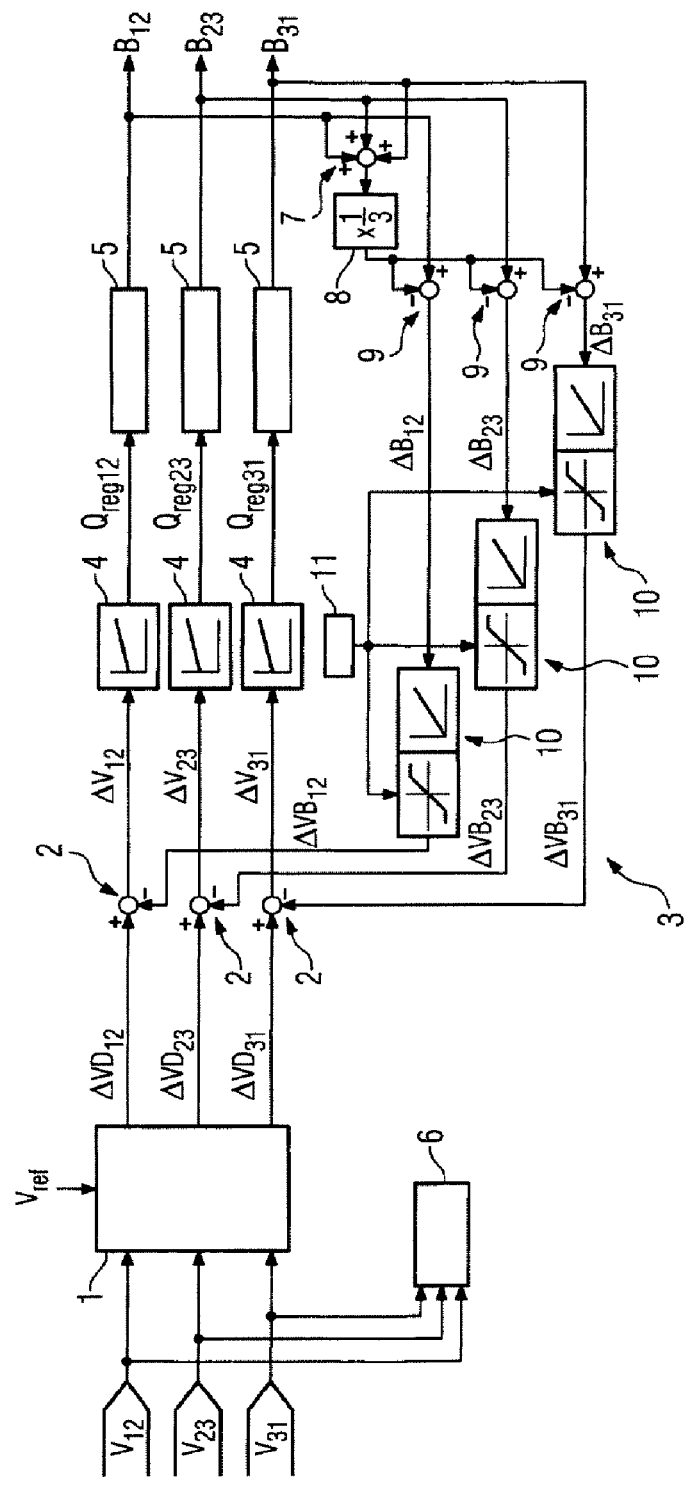

FIG. 1 schematically illustrates a method for controlling an SVC, by means of which a negative phase-sequence system is suppressed or partially allowed. For this purpose, voltage sensors detect the voltage which is dropped across the phases and provide phase voltage measured values $v_{1,2}$, $v_{2,3}$ and $v_{3,1}$. The phase voltage measured values $v_{1,2}$, $v_{2,3}$ and $v_{3,1}$ obtained in this way are supplied to a difference voltage production unit 1, which produces difference voltage $\Delta vD_{12}$, $\Delta vD_{23}$ and $\Delta vD_{31}$ at its output. The difference voltages can be calculated in various ways. Merely by way of example, reference is made to the discrepancy between the phase voltage measured value and a mean value of the phase voltage averaged over all three phases. Furthermore, a reference voltage $v_{ref}$ is supplied to the difference voltage production unit 1, and likewise plays a role in determining the difference voltages. For example, the mean value of the phase voltage measured values is compared with the reference voltage, with the difference calculated in this way being applied to all phases. The difference voltages obtained in this way are each supplied to subtractors 2 which, at their output, produce the difference between the difference voltages AvD and the output of a feedback loop 3, resulting in corrected difference voltages $\Delta v_{12}$, $\Delta v_{23}$ and $\Delta v_{31}$. The feedback loop 3 will be described in more detail later.

The corrected difference voltages $\Delta v$ are each supplied to a voltage regulator 4 which, at its output, produces reactive-power control variables $Q_{reg12}$, $Q_{reg23}$ and $Q_{reg31}$, which are respectively converted by a conversion unit 5 to susceptance values $B_{12}$, $B_{23}$ and $B_{31}$. The susceptance values $B_{12}$, $B_{23}$ and $B_{31}$ or the reactive-power control variable $Q_{reg}$ are/is used as a control variable of the SVC. If the output of the feedback loop 3 is equal to zero for all phases, the control system ensures that a voltage drop in the phase 1 and constant voltages in phases 2 and 3 result in a negative difference voltage value $\Delta Dv_{12}$. The negative difference voltage value $\Delta Dv_{12}$ produces a greater reactive-power control variable $Q_{reg1,2}$ on the output side of the voltage regulator 4 than for the remaining phases 2 and 3. In comparison to the remaining phases, the SVC results in an increased feed-depending on the operating point of the SVC—of capacitive reactive power, or reduced feed of inductive reactive power, thus compensating for the voltage drop in the phase 1. The negative phase-sequence system is suppressed in this way. The negative phase-sequence system is calculated by a negative phase-sequence system calculation unit 6, which is likewise supplied with the phase voltage measured values $v_{12}$, $v_{23}$ and $v_{31}$, and is displayed to a user.

However, without the influence of the feedback loop 3, a control method such as this is susceptible to errors. For example, if a single phase of the connected power distribution line fails totally, it is no longer possible to suppress the negative phase-sequence system without completely interrupting the power transmission. The feedback loop 3 is therefore used to limit the suppression of the negative phase-sequence system. For this purpose, the mean value of the susceptance values is first of all formed with the aid of an adder 7 and a divider 8, with difference susceptance values $\Delta B_{12}$, $\Delta B_{23}$ and $\Delta B_{31}$ being determined with the aid of the subtractor 9. These difference susceptance values are then each supplied to a feedback regulator 10 which, at its output, produces feedback difference voltages $\Delta vB_{12}$, $\Delta vB_{23}$ and $\Delta vB_{31}$ which are each supplied to the subtractor 2 as a second input variable. In this case, each feedback regulator 10 is limited at the top and bottom by an upper and a lower limit, which are defined by means of a limit preset unit 11. The degree of suppression of the negative phase-sequence system can be adjusted by adjusting the upper and lower limits, which are otherwise the same for all phases.

If, for example, the limits of each feedback regulator 10 are set to zero, the effect of the feedback loop 3 is increased. The suppression of the negative phase-sequence system is allowed without any impediment or restriction. In contrast, if the limits of each regulator are set to infinity, the negative phase-sequence system is not suppressed at all. The negative phase-sequence system is therefore allowed as it is. There is no balancing of the phase voltages.

The abovementioned control method has the disadvantage that the upper and lower limits of the feedback regulator 10 must be entered manually, that is to say for example by the personnel at a control center. However, this is complex and can lead to damage, particularly if the operator is careless.

BRIEF SUMMARY OF THE INVENTION

The object of the invention is therefore to provide a method of the type mentioned initially which allows the maximum permissible negative phase-sequence system to be adjusted largely independently of the operator.

The invention achieves this object in that a comparator unit compares the negative phase-sequence system actual component with a negative phase-sequence system nominal component, and defines the control parameters as a function of the comparison.

According to the invention, a comparator unit is provided which allows the maximum permissible negative phase-sequence system to be adjusted automatically. Internal logic implemented in the comparator unit determines control parameters by means of which the degree of suppression of the negative phase-sequence system, or in other words of the negative phase-sequence system actual component, can be defined. Even in the event of a voltage dip in only one phase of the power transmission line to which the static VAr compensator is connected, this allows the static VAr compensator to be operated stably within the scope of the invention without any need for an operator to monitor the static VAr compensator.

A difference signal ΔvD is advantageously produced for each actual voltage and corresponds to a discrepancy between the actual voltage and that/those in other phases. An output signal from the overall voltage feedback loop is applied to each difference signal, resulting in a regulator input signal. The regulator input signals are applied to the input of a regulator for the control loop, whose output signals determine the method of operation of the VAr compensator. For the purposes of the invention, the VAr compensator is, for example, a static VAr compensator, as has already been described in the introduction. The output signals from the regulator $Q_{reg}$,B are expediently the actual value input signals of the feedback loop.

The feedback loop advantageously converts the actual value input signals to said output signals of the feedback loop by means of a feedback regulator, with the control parameters limiting the feedback regulator.

According to one expedient further development relating to this, the control parameters form upper and lower limits for the feedback regulator. The upper and lower limits provide a particularly simple and low-cost adjustment capacity.

According to one preferred development of the method according to the invention, the comparator unit produces control parameters which prevent suppression of the negative phase-sequence system when the negative phase-sequence system component is less than the negative phase-sequence system nominal component. If a certain amount of unbalanced voltage distribution is permissible, but the unbalance in the power distribution system is less, maximum upper and lower limits are provided, for example, as control parameters for the feedback regulator. The negative phase-sequence system is permitted with the maximum limits.

In contrast, if the negative phase-sequence system actual component corresponds to the negative phase-sequence system nominal component, the comparator unit advantageously produces control parameters by means of which the control loop does not counteract any decrease in the negative phase-sequence system actual component in the power distribution system, and, at the same time, an increase in the negative phase-sequence system actual component beyond the negative phase-sequence system nominal component is suppressed. This is done by expedient choice of the upper and lower limits for the feedback regulator. If the negative phase-sequence system actual component reaches the negative phase-sequence system nominal component within the scope of the permissible discrepancies, the instantaneous integrator value of the regulator is used, for example, as the upper or lower limit, depending on the mathematical sign, with the respective other limit value being set to be equal to zero. If the integrator value is negative, this is used as the lower limit, and vice versa.

If the negative phase-sequence system actual component is greater than the negative phase-sequence system nominal component, the comparator unit expediently changes the control parameters such that the negative phase-sequence system actual component is reduced until it is less than or equal to the negative phase-sequence system nominal component. According to one expedient refinement, the instantaneous integrator value of the feedback regulator is, for example, stored once, and is used as the upper and lower limit for the feedback regulator, depending on its mathematical sign. Once again, the respective other limit is set to zero. The higher limit value is then reduced, that is to say is moved towards zero, until the negative phase-sequence system actual value corresponds to the nominal value.

Further expedient refinements and advantages of the invention are the subject matter of the following description of exemplary embodiments of the invention, with reference to the figures of the drawing, in which the same reference symbols refer to components or methods steps having the same effect, and in which:

BRIEF DESCRIPTION OF THE SEVERAL VEIWS OF THE DRAWINGS

Figure 2:
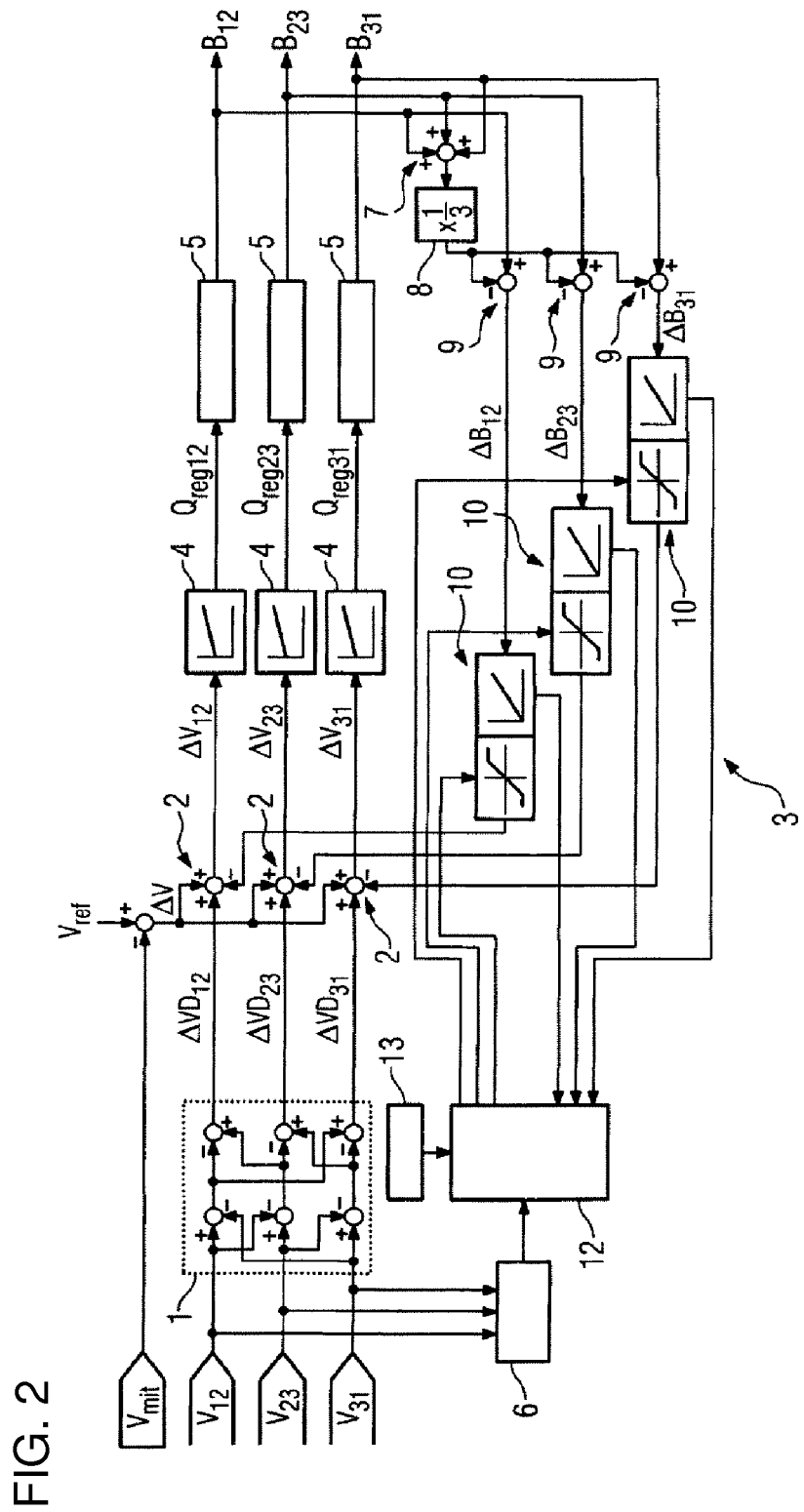

FIG. 1 shows a schematic illustration of a control method for a VAr compensator or a static VAr compensator, and FIG. 2 shows a method according to the invention, illustrated schematically.

BRIEF DESRIPTION OF THE INVENTION

FIG. 1 has already been described further above, in conjunction with the prior art, and there is therefore no need to describe it in any more detail at this point.

FIG. 2 schematically illustrates one exemplary embodiment according to the present invention. In contrast to FIG. 1, FIG. 2 shows the difference voltage production unit 1 in detail. The example of a difference voltage production unit 1 comprises two series-connected subtractors for each of the connected phases. The difference voltage $\Delta vD_{12}$ is therefore calculated using $\Delta vD_{12} = v_{31} + v_{23} - 2v_{12}$. $\Delta vD_{23}$ is given by: $\Delta vD_{23} = v_{12} + v_{31} - 2v_{23}$. Correspondingly, for $\Delta vD_{31}$: $\Delta vD_{31} = v_{23} + v_{12} - 2v_{31}$. Furthermore, a mid-voltage meanpoint measured value $v_{mid}$ determined over all the phases is subtracted from a reference voltage $v_{ref}$ by means of a subtractor, resulting in an overall voltage discrepancy $\Delta v$. This overall voltage discrepancy $\Delta v$ is applied to each phase individually, as a result of which the voltage is kept constant overall. The corrected difference voltage $\Delta v_{12}$, $\Delta v_{23}$ and $\Delta v_{31}$ for each phase is once again produced at the output of the respective subtractor 2.

In contrast to the method illustrated in FIG. 1, according to the exemplary embodiment of the invention illustrated in FIG. 2, each feedback regulator 10 is connected to a comparator unit 12, as a result of which the comparator unit 12 is supplied with the respective integrator value from the feedback regulator 10 as an input signal. A further input signal for the comparator unit 12 is the output from the negative phase-sequence system calculation unit 6, which produces a negative phase-sequence system actual component. FIG. 2 also shows a negative phase-sequence system nominal value selection unit 13, which supplies the comparator unit 12 with a negative phase-sequence system nominal component. The comparator unit 12 compares the negative phase-sequence system actual component with the negative phase-sequence system nominal component, and defines the upper and lower limits for the feedback regulator 10 as a function of the comparison, as is indicated by the arrows leading from the comparator unit 12 to the feedback regulator 10.

If the negative phase-sequence system actual component is less than the negative phase-sequence system nominal component, the upper and lower limits of the respective feedback regulator 10 are set to the respective possible maximum values. The maximum values are expediently made available as parameters to the comparator unit 12 by the user of the method, as a result of which the negative phase-sequence system is allowed completely, allowing formation of a negative phase-sequence system. In contrast, if the negative phase-sequence actual component is equal to the negative phase-sequence system nominal component, within the range of the tolerance bands, the instantaneous integrator value is in contrast stored once. If the integrator value is negative, this is used as the lower limit for the feedback regulator 10. In contrast, if the integrator value is positive, this is used as the upper limit for the feedback regulator. The respective other limit is set to zero. This therefore prevents any increase in the negative phase-sequence system actual component, while the integrators for the feedback regulator 10 can move towards zero when the negative phase-sequence system actual component in the power distribution system decreases. The SVC itself therefore does not produce any power supply system unbalance.

If, in contrast, the negative phase-sequence system actual component is greater than the negative phase-sequence system nominal component, the instantaneous integrator values are once again stored once, and are used as upper and lower limits, depending on the mathematical sign, with the respective other limit being set to zero. The process of reducing the limits which have not been set to zero is then started, until the actual components are once again below or in the region of the nominal values.

The invention claimed is:

1. A method for controlling a VAr compensator connected to an AC voltage having a plurality of phases, which comprises the steps of:
   determining an actual voltage dropped across each of the phases;
   calculating a negative phase-sequence system actual component from the actual voltages and in which a control loop suppresses the negative phase-sequence system actual component;
   determining, via a feedback loop, a degree of suppression of the negative phase-sequence system actual component with a aid of control parameters;
   comparing, via a comparator unit, the negative phase-sequence system actual component with a negative phase-sequence system nominal component; and
   defining, via the comparator unit, the control parameters in dependence on the comparing step.

2. The method according to claim 1, which further comprises:
   producing a difference signal for the actual voltage of each of the phases, the difference signal corresponding to a discrepancy between the actual voltage and at least one actual voltage in another phase;
   applying an output signal from the feedback loop to the difference signal of each of the phases resulting in regulator input signals; and
   applying the regulator input signals to an input of a regulator for the control loop, the regulator outputting output signals to determine a method of operation of the VAr compensator.

3. The method according to claim 2, wherein the output signals of the regulator are actual value input signals of the feedback loop.

4. The method according to claim 3, wherein the feedback loop converts the actual value input signals to output signals of the feedback loop by means of a feedback regulator, with the control parameters limiting the feedback regulator.

5. The method according to claim 4, wherein the control parameters form upper and lower limits for the feedback regulator.

6. The method according to claim 1, wherein when the negative phase-sequence system actual component is less than the negative phase-sequence system nominal component, the comparator unit produces the control parameters to prevent suppression of a negative phase-sequence system.

7. The method according to claim 1, wherein when the negative phase-sequence system actual component corresponds to the negative phase-sequence system nominal component, the comparator unit produces the control parameters by means of which the control loop does not counteract any decrease in the negative phase-sequence system actual component, and, at a same time, an increase in the negative phase-sequence system actual component beyond the negative phase-sequence system nominal component is suppressed.

8. The method according to claim 1, wherein when the negative phase-sequence system actual component is greater than the negative phase-sequence system nominal component, the comparator unit changes the control parameters such that the negative phase-sequence system actual component is reduced until it is less than or equal to the negative phase-sequence system nominal component.

* * * * *